(12) United States Patent
Chabbi et al.

(10) Patent No.: US 8,381,175 B2
(45) Date of Patent: Feb. 19, 2013

(54) LOW-LEVEL CODE REWRITER VERIFICATION

(75) Inventors: Milind Mohan Chabbi, Bellevue, WA (US); Casimir Lakshan Fernando, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 486 days.

(21) Appl. No.: 12/724,762

(22) Filed: Mar. 16, 2010

(65) Prior Publication Data

US 2011/0231824 A1 Sep. 22, 2011

(51) Int. Cl.
*G06F 9/45* (2006.01)
(52) U.S. Cl. .................. 717/106; 717/110; 717/121
(58) Field of Classification Search .................. None
See application file for complete search history.

(56) References Cited

U.S. PATENT DOCUMENTS

| | | | |
|---|---|---|---|
| 6,305,010 B2 | 10/2001 | Agarwal | |
| 6,865,735 B1 | 3/2005 | Sirer et al. | |
| 7,043,715 B1 | 5/2006 | Bauer et al. | |
| 2006/0248519 A1 | 11/2006 | Jaeger et al. | |
| 2007/0234070 A1 | 10/2007 | Horning et al. | |
| 2008/0250399 A1 | 10/2008 | Huang et al. | |
| 2010/0158048 A1* | 6/2010 | Arimilli et al. ............... | 370/476 |

OTHER PUBLICATIONS

De Sutter, et al., "Link-Time Binary Rewriting Techniques for Program Compaction", Retrieved at <<http://users.elis.ugent.be/~brdsutte/research/publications/2005TOPLASdesutter.pdf>>, Sep. 2005, ACM Transactions on Programming Languages and Systems, vol. 27, No. 5, Sep. 2005, pp. 882-945.
Cappaert, et al., "Towards Tamper Resistant Code Encryption: Practice and Experience", Retrieved at <<https://www.cosic.esat.kuleuven.be/publications/article-1026.pdf>>, Information Security Practice and Experience, vol. 4991/2008, pp. 15.
Song, et al., "Utilizing Binary Rewriting for Improving End-Host Security", Retrieved at <<http://ieeexplore.ieee.org/stamp/stamp.jsp?tp=&amumber=4359394>>, IEEE Transactions on Parallel and Distributed Systems, vol. 18, No. 12, Dec. 2007, pp. 1687-1699.
Ertvelde, et al., "Dispersing Proprietary Applications as Benchmarks through Code Mutation", Retrieved at <<http://users.elis.ugent.be/~lvertvel/asplos125-van-ertvelde.pdf>>, ACM SIGARCH Computer Architecture News, vol. 36, Issue 1, Mar. 5, 2008, pp. 10.
"System V Application Binary Interface", Retrieved at <<http://www.sco.com/developers/gabi/latest/contents.html>>, Oct. 26, 2009, pp. 2.

(Continued)

*Primary Examiner* — Chuck Kendall
(74) *Attorney, Agent, or Firm* — Ogilvic Law Firm

(57) ABSTRACT

Verification of low-level rewriters such as binary rewriters involves "vanilla" rewriting a file to generate a rewritten low-level file without performing any optimization, compaction, or other substantive low-level code transformation during the rewrite. Then the metadata of the original low-level file is automatically compared with matching metadata of the rewritten low-level file for semantic equivalence. A properly functioning rewriter produces semantically equivalent files, whereas a defective rewriter may produce files whose metadata semantics differ. Comparison may distinguish composite metadata entities from self-contained metadata entities, and transitive closures of metadata may be compared. Comparison may also test for bitwise equality of self-contained metadata entities, and test for equality between respective flags, strings, fields, and/or methods of the original and rewritten files. Syntactic variants may be detected during comparison, and metadata may be converted into a canonical form to facilitate comparison.

19 Claims, 4 Drawing Sheets

OTHER PUBLICATIONS

"Microsoft Portable Executable and Common Object File Format Specification", Feb. 17, 2010, Retrieved at <<http://www.microsoft.com/whdc/system/platform/firmware/PECOFF.mspx>>, Mar. 27, 2008, pp. 2.

"Standard ECMA-335 Common Language Infrastructure (CLI)", Retrieved at <<http://www.ecma-international.org/publications/standards/Ecma-335.htm>>, 4th edition, Jun. 2006, pp. 2.

"Common Compiler Infrastructure", Retrieved at <<http://ccimetadata.codeplex.com/>>, Retrieved date : Feb. 17, 2010, p. 1.

"Byte Code Engineering Library BCEL", Retrieved at <<http://jakarta.apache.org/bcel/index.html>>, Retrieved Date; Feb. 17, 2010, p. 1.

"Diablo", Retrieved at <<http://diablo.elis.ugent.be/>>, Retrieved Date: Feb. 17, 2010, pp. 3.

Hopcroft, et al., "Introduction To Automata Theory, Languages, And Computation", Retrieved at <<http://unipa.cblue.org/2008/documents/Grammatiche-Cap5.pdf, 2nd Edition, Department: Education forum, vol. 32 , Issue 1, 2001, pp. 50.

"Chapter 4: The class File Format", Retrieved at <<http://java.sun.com/docs/books/jvms/second_edition/ClassFileFormat-Java5.pdf>>, Apr. 24, 1999, pp. 82.

"BCEL Release History (binary rewriter defects)", Retrieved at <<http://jakarta.apache.org/bcel/changes-report.html>>, Jun. 4, 2006, pp. 2.

"Common Compiler Infrastructure (binary rewriter defects)", Retrieved at <<http://ccimetadata.codeplex.com/WorkItem/List.aspx, Feb 9, 2010, pp. 2.

Sipser, "Introduction to the Theory of Computation", Retrieved at <<http://www.amazon.com/Introduction-Theory-Computation-Michael-Sipser/dp/053494728X>>, 1996, pp. 8.

* cited by examiner

LOW-LEVEL CODE REWRITER VERIFICATION

BACKGROUND

Many computer programs begin as source code, which is relatively easy for human readers to understand and modify in comparison with lower level code such as intermediate language codes, byte codes, assembly codes, and machine language codes. Computer program source code is written and edited using text editors, version control systems, and other tools. Lower level codes are generated from source code, and/or from other lower level codes, using tools such as compilers, interpreters, linkers, and optimizers.

Some binary rewriters are tools that can be used to optimize binary codes by removing duplicate instructions, removing unreachable instructions, and removing duplicate data, for example. Binary rewriters do not make use of source code, but instead take lower level code as input and produce lower level code as output. In addition to their uses for optimization, binary rewriters have been used to insert security codes into binary executable code, to insert program instrumentation for performance profiling, and to obfuscate binary code in order to help protect confidential information about the code's structure and operations. The changes made in binary files by a binary rewriter are sometimes referred to as transformations, mutations, and/or optimizations, for example. Changes which do not produce functionally equivalent binary code are generally treated as errors in the binary rewriting process.

SUMMARY

Off-the-shelf binary rewriters are widely used in software production as well as in research for a variety of purposes including code optimization, code compaction, contract enforcement, and others. Defects in binary rewriting are often hard to trace and debug, and may result in substantial costs. Formal approaches to verify the correctness of binary rewriters are lacking, and scenario-driven targeted testing is inadequate for verifying binary rewriters.

However, some embodiments presented herein provide verification of low-level rewriters, including binary rewriters and other rewriters that operate on low-level code without using source code. An initial binary file or another initial low-level file containing code and metadata is obtained, and the low-level rewriter generates a rewritten low-level file from the initial low-level file without performing any optimization, compaction, or other low-level code transformation. Then the metadata of the initial low-level file is compared with matching metadata of the rewritten low-level file for semantic equivalence. A properly functioning rewriter produces semantically equivalent files, whereas a defective rewriter may produce files whose metadata semantics differ. In some cases, comparison includes distinguishing composite metadata entities from self-contained metadata entities, and in some cases, transitive closures of metadata are compared. Comparison may also test for bitwise equality of self-contained metadata entities, and test for equality between respective flags, strings, fields, and/or methods of the initial and rewritten files. Syntactic variants may be detected during comparison, and metadata may be converted into a canonical form to facilitate comparison.

The examples given are merely illustrative. This Summary is not intended to identify key features or essential features of the claimed subject matter, nor is it intended to be used to limit the scope of the claimed subject matter. Rather, this Summary is provided to introduce—in a simplified form— some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
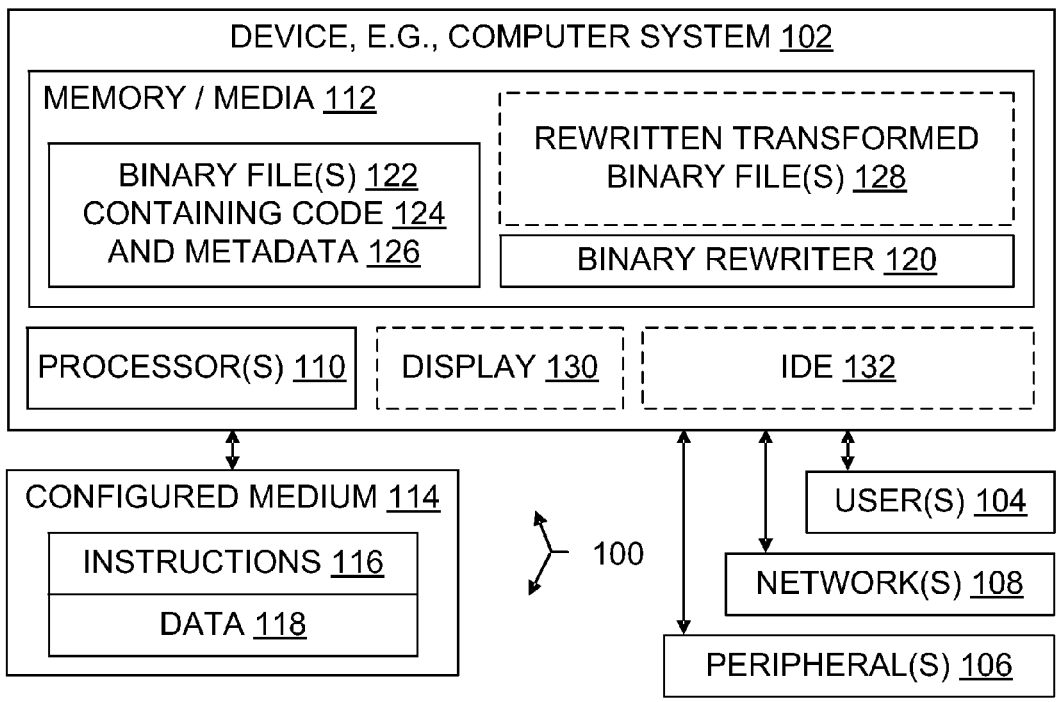
FIG. 1 is a block diagram illustrating a computer system having at least one processor, at least one memory, at least one binary rewriter and/or other low-level rewriter, binary low-level file(s), and other items in an operating environment which may be present on multiple network nodes, and also illustrating configured storage medium embodiments.

A binary rewriter is a software tool used to examine and modify binary files. Binary rewriters are examples of low-level code rewriters. Binary rewriters transform binary files containing code (instructions and data) and metadata. Off-the-shelf binary rewriters are widely used in software production as well as in research for a variety of purposes, including code optimization, code compaction, contract enforcement, obfuscation, security enhancement, and others. Defects in binary rewriting are hard to trace and debug, and finding them and fixing them may incur a heavy cost. Formal processes to verify the correctness of binary rewriters are lacking. Classic scenario-driven targeted testing is insufficient and often inefficient in verifying binary rewriters.

Some embodiments described herein provide a systematic and practical approach to verifying low-level rewriting generally and binary rewriting in particular. First, we exercise the rewriter in a mode where no deliberate changes are introduced (a "vanilla" rewrite), and produce a binary or other low-level output that is expected to behave the same as the input file, but is not necessarily bit-wise identical. Then we compare metadata components of the original and rewritten files to verify the previously set expectation of behavioral similarity, a.k.a., semantic equivalence. Metadata in a binary file is data from which structure and values of execution time entities are derived. Rules for behavioral similarity may call for semantic equivalence of metadata components across the vanilla rewrite, but provide leeway for syntactic variations to exist. Some embodiments require semantic equivalence of all metadata; some test only user-specified metadata. For example, a rewriter under development may have a known deficiency handling fields, in which case an embodiment may be configurable to skip comparison of field metadata components of the original and rewritten files during semantic equivalence analysis.

Some embodiments support a static analysis approach to verify binary rewriters by establishing functional equivalence while allowing syntactic differences to exist. Some utilize binary-rewriting without introducing deliberate changes, and then establish functional equivalence to prove the fidelity of binary rewriting. Some derive rules of semantic equivalence from standards or file format specifications.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyper-threaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, and similar hardware interface software.

"Code" means processor instructions, data (which includes constants, variables, and data structures), or both instructions and data.

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine.

"Source code" means software code written in a programming language. Source code can be generated automatically, but is typically written by people and meant to be read and maintained by people. In particular, and without excluding other examples, source code includes code written in one or more "high-level" programming languages, such as programming languages contemplated in the Common Language Infrastructure (CLI) open specification, published under ECMA-335 and ISO/IEC 23271, and developed by Microsoft Corporation.

"Low-level code" means intermediate language code, assembly code, byte code, virtual machine code, native machine code, and/or another code which is not generally considered to be source code. Low-level code can be written manually, but is typically generated by a compiler, an interpreter, or another automatic code generator.

"Binary code" herein means the same as "low-level code".

"Metadata" means organized data about program structure and operation. Metadata is typically generated automatically by a compiler, interpreter, or other code generator. Metadata may be organized using tree, graph, and/or tabular data structures, for example. Metadata organization follows syntactic rules making the metadata fully amendable to automated parsing. In particular, and without excluding other examples, metadata as used herein includes metadata as described in the Common Language Infrastructure open specification noted above.

In general, metadata can be stored either internally in the same file as the code, or externally in a separate file. For convenience and clarity, discussions herein generally speak in terms of internal metadata, but unless otherwise explicitly stated all references here and in the claims to a "file" containing code and metadata should be understood to include both (a) situations in which a single file contains the code and the metadata, and (b) situations in which code and metadata are stored in two or more related files. In other words, the use of multiple files rather than a single file does not, in and of itself, exclude systems, devices, configured media, or processes from the scope of claims that speak in terms of "an initial file" (for instance) instead of speaking more verbosely in terms of "a set of one or more initial files".

"Binary file" means a file containing binary code and metadata.

"Low-level file" herein means the same as "binary file".

"Low-level rewriter" means a tool designed to take a low-level file and some specified set (possibly empty) of transformations as input and produce a low-level file as output. A given low-level rewriter may include multiple coordinated sub-tools; a rewriter need not be implemented as a single unitary program. The transformations for the rewriter to perform may be specified as express input entered through a user interface, or they may be implicit input by virtue of being embedded (hard-coded) in the rewriter.

"Binary rewriter" means a low-level rewriter that includes a binary reader, an object model, and a binary writer. A binary reader reads an input low-level file such as an executable file and interprets the meaning of various portions therein according to a file format specification. The object model utilizes the binary reader and builds an intermediate representation of the binary. The binary writer takes the intermediate representation and serializes it back into a low-level file in the specified format.

Throughout this document, use of the optional plural "(s)" means that one or more of the indicated feature is present. For example, "flag(s)" means "one or more flags" or equivalently "at least one flag".

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked.

Human users 104 may interact with the computer system 102 by using displays, keyboards, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable non-transitory storage media 112. Media 112 may be of different physical types. The media 112 may be volatile memory, non-volatile memory, fixed in place media, removable media, magnetic media, optical media, and/or of other types of non-transitory media (as opposed to transitory media such as a wire that merely propagates a signal). In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by as discussed herein, e.g., to and from an object model, by conversion to canonical form, by structural mapping, binding, deployment, execution, modification, display, creation, loading, and/or other operations.

A binary rewriter 120, binary files 122 containing code 124 and metadata 126, rewritten binary files 128, other software, and other items shown in the Figures may reside partially or entirely within one or more media 112, thereby configuring those media. An operating environment may also include other hardware, such as display(s) 130, buses, power supplies, and accelerators, for instance.

A given operating environment 100 may include an Integrated Development Environment (IDE) 132 which provides a developer with a set of coordinated software development tools. In particular, some of the suitable operating environments for some embodiments include or help create a Microsoft® Visual Studio® development environment (marks of Microsoft Corporation) configured to support program development. Some suitable operating environments include Java® environments (mark of Sun Microsystems, Inc.), and some include environments which utilize languages such as C++ or C# ("C-Sharp"), but teachings herein are applicable with a wide variety of programming languages, programming models, and programs, as well as with endeavors outside the field of software development per se that use binary rewriters, rewritten binary files, or both.

Some items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
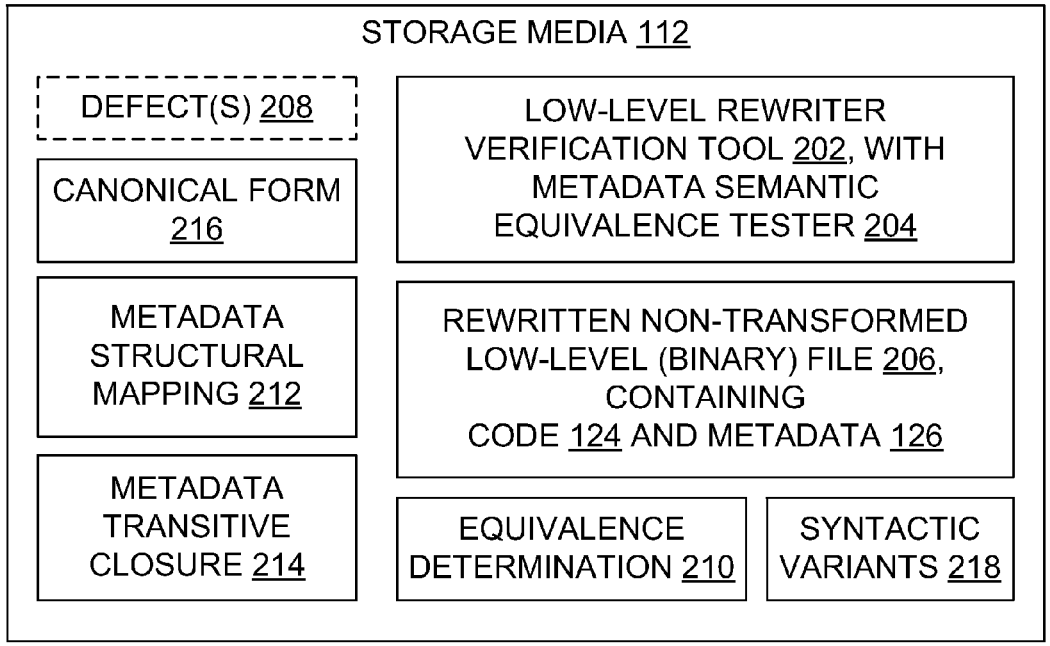
FIG. 2 is a block diagram illustrating low-level rewriter verification in an example architecture.

FIG. 2 illustrates an architecture which is suitable for use with some embodiments. A low-level rewriter verification tool 202 includes a metadata semantic equivalence tester 204, as well as code for controlling a binary rewriter 120 or other low-level rewriter during verification. The verification tool 202 feeds initial low-level file(s) 122 into the rewriter 120 being tested, with the rewriter configured or otherwise controlled (e.g., by command line parameters) by the tool 202 to produce from the initial low-level file(s) rewritten but substantively non-transformed file(s) 206. The rewriter is instructed to produce a "vanilla" rewrite, as opposed to a rewrite involving substantive transformation(s) such as duplicate code removal, duplicate data removal, security enhancement, and so on. The code 124 and metadata 126 of the rewritten file(s) may differ from the code and metadata of the initial file(s), but any such differences indicate defect(s) 208 in the rewriter because no transformation was intended to be performed and the metadata should therefore be unchanged semantically by the rewrite. That is, the detection of rewriter defect(s) depends on whether the metadata of the initial and rewritten files are determined by the verification tool 202 to be semantically equivalent. An equivalence determination 210 produced by the verification tool 202 may be a simple pass/fail indication, or it may be more complex, indicating for example which metadata were compared and the result of each individual comparison.

Semantic equivalence can be investigated by the tool's metadata semantic equivalence tester 204 using metadata structural mapping(s) between the initial and rewritten metadata 126, as discussed in detail herein. In some cases, transitive closures 214 of metadata are compared by the tester 204. In some cases, metadata are converted by the tester 204 from their structure in the file(s) into a canonical form 216 to facilitate comparison.

With reference to FIGS. 1 and 2, some embodiments provide a computer system 102 with a logical processor 110 and a memory medium 112 configured by circuitry, firmware, and/or software to verify low-level rewriters as described herein. A memory is in operable communication with the logical processor. An initial binary file 122 residing in the memory contains code and metadata. A binary rewriter verification tool 202 residing in the memory has a metadata semantic equivalence tester 204. Also residing in the memory is a binary rewriter 120 which is being subjected to verification and/or a vanilla rewritten binary file 206 from the binary rewriter being tested. That is, the verification tool 202 may have access to the rewriter so the tool 202 can produce the vanilla rewritten file, or the tool 202 may have the vanilla rewritten file, or the tool may have both the rewriter and a vanilla file previously generated by the rewriter from the initial file 122.

In some cases, the memory is also configured by a determination 210 produced by the binary rewriter verification tool as to metadata semantic equivalence of the initial binary file and the vanilla rewritten binary file. The determination 210 may be embodied in a file or in a display 130 output, for example. At a minimum, the determination indicates whether the initial binary file and the vanilla rewritten binary file are semantically equivalent, that is, whether any defect(s) 208 were found in the rewriter.

In some embodiments, a transitive closure 214 of metadata of the initial binary file and/or a transitive closure of metadata of the rewritten binary file also reside in (and hence configure) the memory. Metadata can be organized in trees or other graphs, which have nodes and links between nodes. The transitive closure of a collection of nodes can be defined in terms of the links between the nodes. For example, in some situations metadata is defined in a collection of trees, in which any solitary (single-node) trees and any leaf nodes of multi-node trees are self-contained metadata entities, and interior nodes are composite metadata entities. In such situations, the transitive closure of a single-node tree is the single-node tree, and the transitive closure of any entity node in a multi-node tree is the tree. Transitive closures 214 can be implemented in memory and other storage media 112 using objects, records, structs, pointers, and/or other familiar graph/tree implementation mechanisms. Semantic equivalence can define a relation between metadata nodes in the initial file and metadata nodes in the rewritten file. The metadata semantic equivalence tester 204 in some embodiments identifies transitive closures and tests for equivalence between transitive closure(s) in the initial file and matching transitive closure(s) in the vanilla rewritten file.

In some embodiments, the storage medium 112 contains a structural mapping 212 between metadata in the initial file 122 and metadata in the vanilla rewritten file 206. The mapping 212 can be implemented using tables, lists, arrays, pointers, records, objects, bitmaps, and/or other mapping/linkage/correspondence implementation mechanisms. The mapping 212 can be generated by traversing metadata entities in the files, beginning for instance with a root entity or a first encountered entity, and checking at each node or entry to see whether the entities match, e.g., in terms of their identifiers, their location in their respective trees, and/or their other characteristics.

In particular, some embodiments include a metadata entity alpha_initial in the initial binary file and a metadata entity alpha_rewritten in the vanilla rewritten binary file. The mapping 212 memorializes a correspondence (mapping) between alpha_initial and alpha_rewritten, after the equivalence tester 204 determines that each of these entities has the same literal ordering of method body instructions and that operands of corresponding instructions of the entities are semantically equivalent.

As another particular example, some embodiments include a metadata entity alpha_initial in the initial binary file and a metadata entity alpha_rewritten in the vanilla rewritten binary file; these names are again hypothetical, and these two entities are not necessarily the same entities as in the previous particular example. In this example, the mapping 212 memorializes a correspondence (mapping) between alpha_initial and alpha_rewritten after the equivalence tester 204 determines that one of the entities is a syntactic variant 218 of the other entity.

As yet another particular example, some embodiments include a metadata entity alpha_initial in the initial binary file and a metadata entity alpha_rewritten in the vanilla rewritten binary file (again, not necessarily the same entities as in the previous particular examples). In this example, the equivalence tester 204 converts each entity to a canonical form 216, and then the mapping 212 memorializes a correspondence (mapping) between the chosen canonical form of metadata entity alpha_initial in the initial binary file and the chosen canonical form of a metadata entity alpha_rewritten in the rewritten binary file.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Processes

Figure 3:
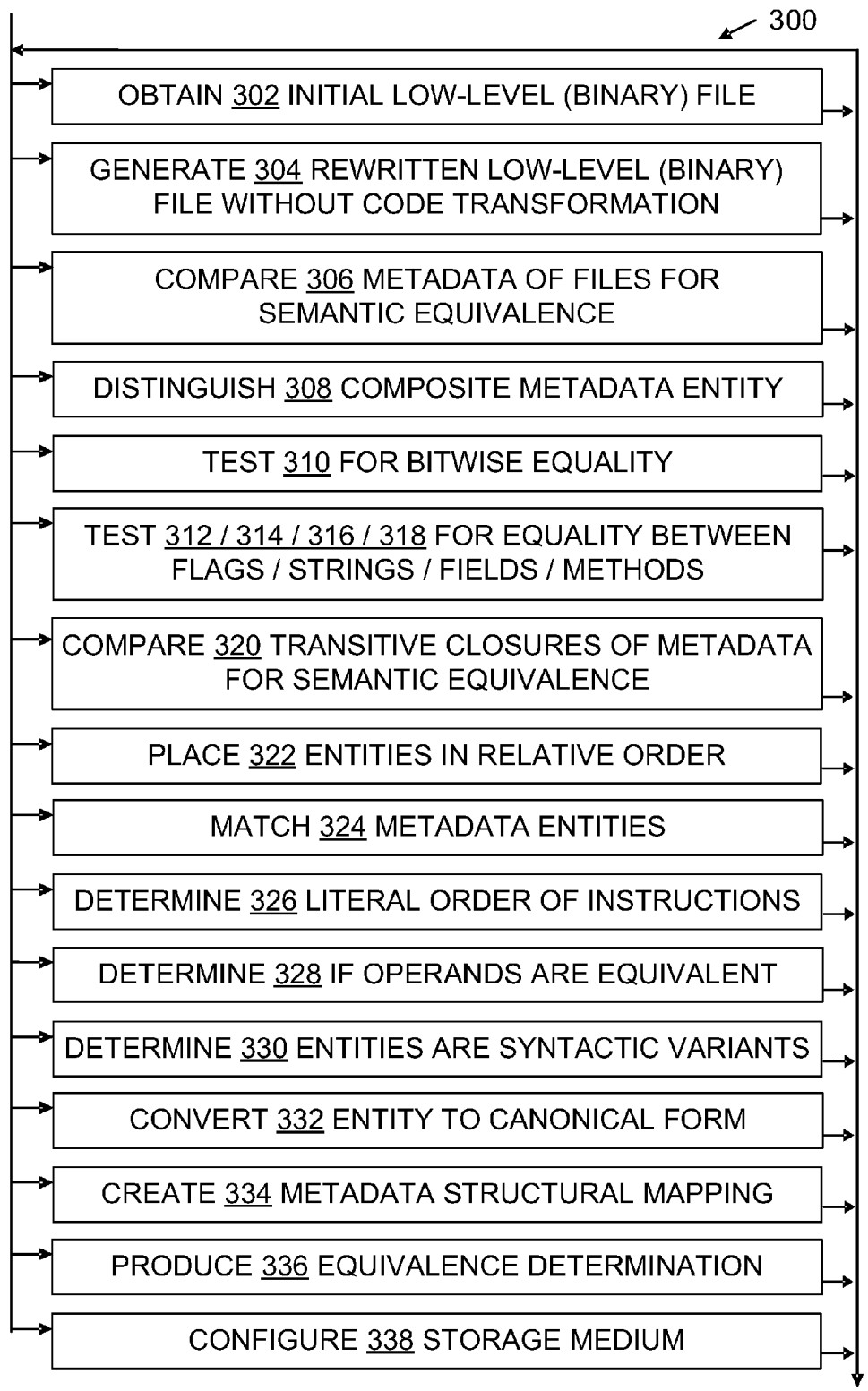
FIG. 3 is a flow chart illustrating steps of some process and configured storage medium embodiments.
Figure 4:
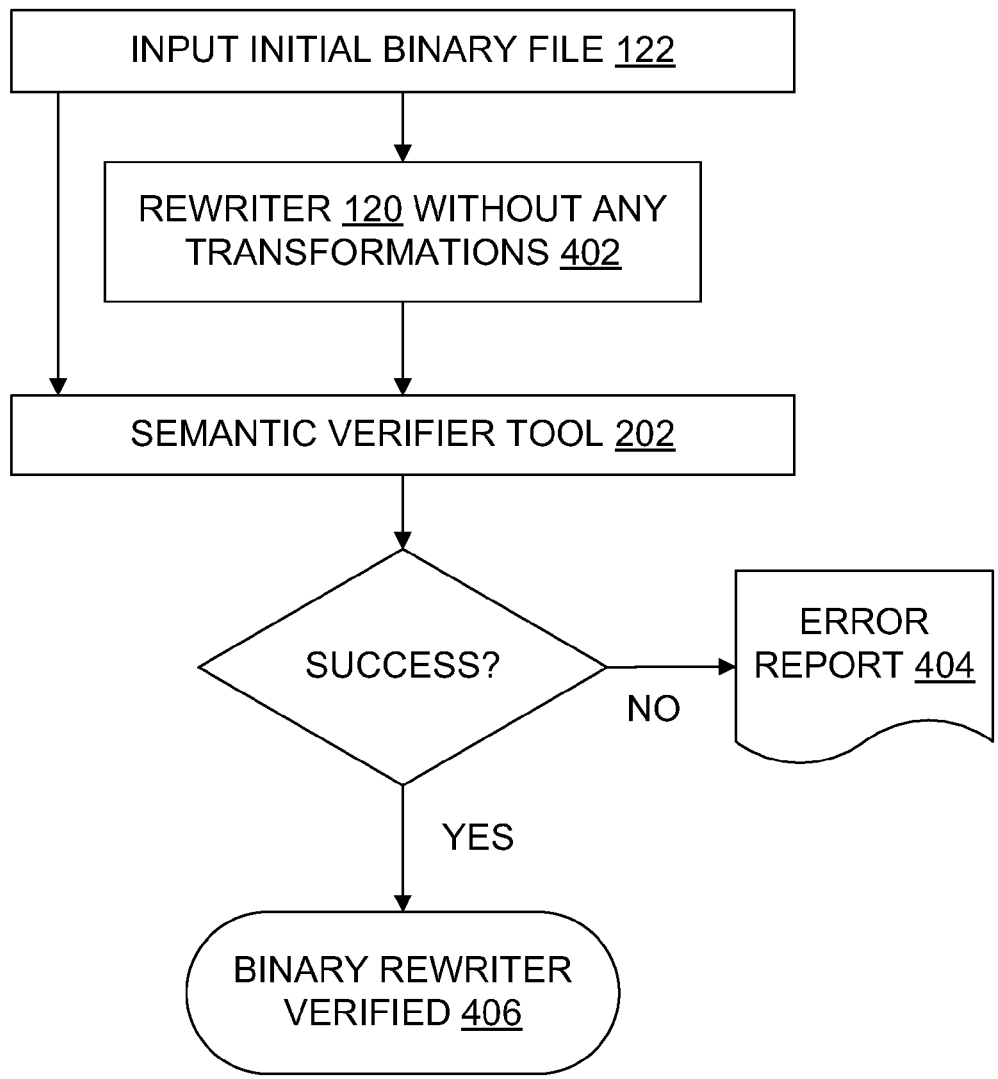
FIG. 4 is a data flow diagram illustrating binary rewriter verification.

FIG. 3 illustrates some process embodiments in a flowchart 300; FIG. 4 illustrates embodiments in a data flow diagram. Processes shown in the Figures may be performed in some embodiments automatically, e.g., by a metadata semantic equivalence tester 204 under control of a script requiring little or no user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 4. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps shown in the Figures may also be omitted, combined, renamed, regrouped, or otherwise depart from the illustrated flows, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During an initial file obtaining step 302, an embodiment obtains an initial binary or low-level file 122, e.g., by receiving the file name from a user and accessing the file through a file system. The file may be local or remote, with respect to the verification tool 202. As noted above, the "file" may actually be a collection of multiple files. Also, use herein of the term "file" does not imply a requirement that the file reside in a hard disk or other non-volatile medium; the file may also be created, used, and ultimately released entirely within volatile non-transitory media 112 such as RAM. The initial file may also be directly from a compiler, for example, or the file may have been produced by a binary rewriter.

During a vanilla file generating step 304, an embodiment generates a rewritten "vanilla" binary file 206. That is, the embodiment causes a binary rewriter 120 to generate from the initial binary file 122 a rewritten binary file 206 without applying any transformations within the rewriter to compact code, enhance code security, etc. For example, to accomplish step 304 the verification tool 202 may include a script which invokes the rewriter being tested with the URL of the initial file 122 as a parameter to the invocation.

During a metadata comparing step 306, an embodiment compares metadata of the "before" and "after" binary files 122, 206 to assess the extent and nature of semantic equivalence between the respective files' metadata. In some embodiments, comparing step 306 is performed by a metadata semantic equivalence tester 204.

Several aspects of semantic equivalence are particularly noteworthy at this point in our discussion. First, semantic equivalence pertains to metadata, whereas functional equivalence pertains to a program overall. Second, semantic equivalence may be based at least in part on bitwise equality, but bitwise equality is not always required for semantic equivalence. Third, semantic equivalence is subject to differing interpretations; the rules for determining equivalence may vary between embodiments. For instance, differences in compilers or runtimes might lead to a situation in which different syntactic variants and/or different canonical forms are recognized in different embodiments. Finally, semantic equivalence is defined and discussed herein through structural examples, through procedural examples, and through mathematical formalisms. To the extent these examples and/or formalisms conflict with one another, any consistent subset of them may be used within some embodiment(s).

During a composite/simple distinguishing step 308, an embodiment distinguishes between composite metadata entities in a file and simple (a.k.a. self-contained) metadata entities. Composite metadata entities are those defined in terms of other metadata entities which may themselves be composite and/or simple, whereas simple metadata entities are defined solely in terms of primitives such as strings, enumeration values, integers, and the like. Distinguishing step 308 may be performed by parsing metadata according to a specification which defines the metadata, such as the CLI specification, for instance. Distinguishing step 308 may be performed as part of metadata comparing step 306.

During a bitwise equality testing step 310, an embodiment tests two or more metadata entities or portions thereof for bitwise equality. Testing step 310 may be performed as part of metadata comparing step 306.

During a flag equality testing step 312, an embodiment tests two or more flags of metadata entities for equality. Testing step 312 may be performed as part of metadata comparing step 306.

During a string equality testing step 314, an embodiment tests two or more strings of metadata entities for equality. Testing step 314 may be performed as part of metadata comparing step 306.

During a field equality testing step 316, an embodiment tests two or more fields of metadata entities for equality. Testing step 316 may be performed as part of metadata comparing step 306.

During a method equality testing step 318, an embodiment tests two or more methods of metadata entities for equality. Testing step 318 may be performed as part of metadata comparing step 306.

During a transitive closure comparing step 320, an embodiment tests two or more metadata transitive closures for semantic equivalence. Transitive closures comparing step 320 may be performed as part of metadata comparing step 306 for the overall metadata of two files 122, 206. However, transitive closures comparing step 320 may also be performed while comparing 306 the individual metadata entities that belong to the transitive closures.

During an entities placing step 322, an embodiment places two or more metadata entities within files in some order relative to one another, e.g., with one entity above or before the other entity. Placing step 322 may be performed during rewritten file generating step 304, for example.

During an entities matching step 324, an embodiment matches two or more metadata entities within files to one another, e.g., within a structural mapping 212. Placing step 322 may be performed during metadata comparing step 306, for example. Entities may be tentatively matched 324 and then investigated further for semantic equivalence; inconsistencies between tentatively matched entities may lead to backtracking in which different entities are matched 324 and investigated further, until a structural mapping 212 based on investigated semantic equivalence is constructed.

During an instruction order determining step 326, an embodiment determines a literal order for low-level instructions within a binary file 122, 206. In particular, blocks of instructions having the same literal order may be identified during metadata comparing step 306, based on determining step 326 results.

During an operand equivalence determining step 328, an embodiment determines whether operands of corresponding instructions within binary files 122, 206 are semantically equivalent. For example, operand data types, operand modes and similar aspects may be compared during step 328. Operand equivalence determining step 328 may be performed as part of metadata comparing step 306.

During a syntactic variant determining step 330, an embodiment determines whether metadata entities are syntactic variants 218 and thus (at least potentially) semantic equivalents of one another. Step 330 may be guided by programming language file format specifications, for example, which identify or otherwise allow syntactic variants that have the same functional behavior in a program. Syntactic variant determining step 328 may be performed as part of metadata comparing step 306.

During a metadata form converting step 332, an embodiment converts a metadata entity, or an internal working copy/representation of a metadata entity, into a canonical form 216. For example, syntactic variants may be all converted to a single canonical form, or equivalently, one of the variants may be chosen and used as a canonical form representing all the variants. Converting step 332 may be performed as part of metadata comparing step 306.

During a mapping creating step 334, an embodiment creates a metadata structural mapping 212, e.g., by traversing metadata in two files 122, 206 and noting which metadata entities are semantically equivalent during comparing step 306.

During an equivalence determination producing step 336, an embodiment produces a semantic equivalence determination 210, such as by outputting equivalence/lack of equivalence results for individual metadata during a sequence of comparing steps 306.

During a memory or other storage medium configuring step 338, a memory medium 112 is configured by a metadata semantic equivalence tester 204, an equivalence determination 210, a metadata structural mapping 212, a metadata transitive closure 214, a rewriter verification tool 202, and/or otherwise in connection with low-level rewriter verification as discussed herein.

Turning now to FIG. 4, an initial binary file 122 is input to a low-level rewriter 120 being verified. The rewriter is configured to produce a rewritten file 206 without applying any substantive transformations 402 to the input file. The initial binary file and the rewritten file are then input to a semantic verifier tool 202 or at least to a semantic equivalence tester portion of such a tool. If the rewriter operates successfully, then the metadata of the initial and rewritten files is found to be semantically equivalent, and the rewriter is thus verified 406, at least with regard to the binary file 122 utilized as input. If not, then an error report 404 is produced as part of an equivalence determination, detailing for example which metadata were found semantically nonequivalent.

The foregoing steps and their interrelationships are discussed in greater detail below, in connection with various embodiments.

Some embodiments provide a process for verifying operation of a low-level rewriter 120. The process utilizes a device or system 102 which has at least one logical processor 110 in operable communication with at least one memory medium 112. The process includes obtaining 302 an initial low-level file 122 containing code and metadata, generating 304 a "vanilla" rewritten low-level file 206 from the initial low-level file by applying the low-level rewriter to the initial low-level file independently of any low-level code transformation 402, and comparing 306 metadata of the initial low-level file with matching metadata of the rewritten low-level file for semantic equivalence.

In some embodiments, the comparing step 306 distinguishes 308 composite metadata entities from self-contained metadata entities. In some, comparing 306 includes testing 310 for bitwise equality of a self-contained metadata entity of the initial low-level file and a matching self-contained metadata entity of the rewritten low-level file. In some, comparing 306 includes testing 312 for equality between flags, testing 314 for equality between strings, testing 316 for equality between fields, and/or testing 318 for equality between methods. In each case, testing 312, 314, 316, 318 tests an item (flag, string, field, method) of a metadata entity of the initial low-level file and a corresponding kind of item of a matching metadata entity of the rewritten low-level file. In some embodiments, the comparing step 306 includes comparing a transitive closure 214 of metadata of the initial low-level file with a transitive closure of metadata of the rewritten low-level file for semantic equivalence.

As an additional example of semantic equivalence comparison, in some embodiments the initial low-level file contains a metadata entity alpha_initial and a metadata entity beta_initial in that alpha-beta order relative to one another. The generating step 304 places 322 in the rewritten low-level file a metadata entity beta_rewritten and a metadata entity alpha_rewritten in that beta-alpha order relative to one another. The process includes matching 324 alpha_initial with alpha_rewritten and matching beta_initial with beta_rewritten; specific examples and further details are provided in the Additional Examples portion of this document.

In some embodiments, the process matches 324 a metadata entity alpha_initial in the initial low-level file with a metadata entity alpha_rewritten in the rewritten low-level file after determining 326 that each entity has the same literal ordering of method body instructions and determining 328 that operand(s), if any, of the entities are semantically equivalent. In some, the process matches 324 a metadata entity alpha_initial in the initial low-level file with a metadata entity alpha_rewritten in the rewritten low-level file after determining 330 that one entity is a syntactic variant of the other entity. In some embodiments, the process matches 324 a metadata entity alpha_initial in the initial low-level file with a metadata entity alpha_rewritten in the rewritten low-level file after converting 332 each entity into a canonical form.

Some embodiments provide a process for binary rewriter verification that includes obtaining 302 an initial binary file containing code and metadata, generating 304 a rewritten binary file from the initial binary file by applying the binary rewriter to the initial binary file independently of any binary code transformation, distinguishing 308 a composite metadata entity in the initial binary file from a self-contained metadata entity in the initial binary file, comparing 306 a metadata entity alpha_initial in the initial binary file with a metadata entity alpha_rewritten in the rewritten binary file for semantic equivalence after determining 330 that one entity is a syntactic variant of the other entity, and comparing 306 additional metadata of the initial binary file with additional metadata of the rewritten binary file for semantic equivalence. In some embodiments, comparing 306 includes testing 312 for equality between flags, testing 314 for equality between strings, testing 316 for equality between fields, testing 318 for equality between methods, comparing 320 transitive closures 214, and/or other steps discussed above.

Configured Media

Some embodiments include a configured computer-readable storage medium 112. Medium 112 may include disks (magnetic, optical, or otherwise), RAM, EEPROMS or other ROMs, and/or other configurable memory, including in particular non-transitory computer-readable media (as opposed to wires and other propagated signal media). The storage medium which is configured may be in particular a removable storage medium 114 such as a CD, DVD, or flash memory. A general-purpose memory, which may be removable or not, and may be volatile or not, can be configured into an embodiment using items such as metadata transitive closures 214, metadata structural mappings 212, metadata semantic equivalence canonical forms 216, rewriter verification tools 202, and metadata semantic equivalence testers 204 with vanilla rewritten files 206, in the form of data 118 and instructions 116, read from a removable medium 114 and/or another source such as a network connection, to form a configured medium 112. The configured medium 112 is capable of causing a computer system to perform process steps for transforming data through low-level rewriter verification as disclosed herein. FIGS. 1 through 4 thus help illustrate configured storage media embodiments and process embodiments, as well as system and process embodiments. In particular, any of the process steps illustrated in FIG. 3 and/or FIG. 4, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

By way of background, a lack of formal tools to verify binary rewriting has been observed by the inventors. In response, embodiments herein create a rewritten binary from an input binary without introducing any deliberate transformations, and then feed the original and rewritten binary files to a semantic comparer tool. The semantic comparer (a.k.a semantic verifier, rewriter verification tool 202) compares every metadata entity in the original binary with the corresponding one in the rewritten binary and vice-versa. The rules of semantic equivalence followed during comparison 306 can be derived from the binary file format specifications when guided by the present discussion. Some embodiments compare 306 metadata elements even if they are reordered and/or represented in different syntactic formats. If the comparison yields no equivalence failures, then we deem the binary-rewriter capable of handling the given input; otherwise, we report 404 failure(s) pinpointing the cause(s).

Verification at the source point of binary-rewriter allows bugs to be found sooner and incurs lower cost of fixing them. A classic test execution driven approach is typically not comprehensive since it can usually only exercise certain parts of a binary, and the unexercised parts of binary could have defects. Further, for any sufficiently large binary, exhaustive test execution is excessively time consuming. Experience has shown that this semantic-based approach is static analysis driven and leaves no scope for any false negatives, has minimal false positives, and is efficient. This approach helps ensure binary quality without itself marking production binaries adversely, or indeed, marking or altering them at all, so its use also has the property of being opaque to reverse engineering efforts.

Introduction to Binary Rewriters

A binary rewriter 120 is a software tool that allows one to examine and modify binary files. Typically, binary rewriters take as input a program packaged in a binary file (a file containing code and metadata) adhering to a particular format present as high level construct. A rewriter optionally modifies some aspect(s) of the program and packages the result back into a binary file.

Many binary rewriters have three main components. A binary reader component reads an input executable and interprets the meaning of various portions of an executable as per some specification. A few examples of the many possible specifications include the System V Application Binary Interface specification, the Microsoft® Portable Executable and Common Object File Format Specification, Standard ECMA-335 Common Language Infrastructure (CLI), and the Java® Virtual Machine Specification (Java is a mark of Sun Microsystems, Inc.). An object model component utilizes the binary reader to build an intermediate representation of the binary. A binary writer component takes an intermediate representation and serializes it back into the binary file format.

A binary rewriter can be partly seen as a reverse of a compiler. Compilers have existed for a long time and have been tested extensively. Current day commodity software has led to use of binary-rewriters. For example, in Microsoft's .Net 4.0 environment, every library file is rewritten with an internal binary rewriter to enforce some contracts. It has become common practice to take an off-the-shelf binary rewriter and add/extend functionality to achieve an intended transformation. However, binary rewriters have been little tested. Defects in off-the-shelf binary-rewriters can cause erroneous binary rewrites. A minor flaw in binary rewriting has the potential to create functional defects or even security vulnerabilities. While some defects can be caught by standard test executions on the rewritten assemblies, the assembly testing cannot be exhaustive. This is especially true in the context of large libraries since it is impractical to exercise all code blocks and arcs.

Binary rewrite verification helps assess program equivalence, which has been shown to be un-decidable in the general case. Hence some embodiments taught herein can be useful by assessing the fidelity of binary rewriters to help uncover rewrite defects at their source. Consider the practical approach presented, in which we rewrite a binary file without any substantive transformations, and then check for semantic equivalence of metadata entities between the two binaries (original and rewritten). If this process yields no equivalence failures, then we deem the binary rewriter more likely to be capable of handling the original input correctly with transformations; in case of any equivalence failure(s), we report the point and the cause of failure(s). FIG. 4 shows a workflow for this approach.

Vanilla Transformations

Binary rewriters can be used to merely read a binary, build an object model, and write back out without applying any substantive transformation 402. We call such a resulting binary a vanilla binary. One might be tempted at this point to simply compare an original and a vanilla rewritten binary for byte-by-byte equality, but such comparison is inadequate. Once a binary rewriter has read a file into its object model, it is free to write information back out in a form that need not be byte-wise equivalent to the original file. In fact, bit level equality is impracticable since at times the same high level representation could be packaged into a binary in multiple ways. To help illustrate this point, consider some examples.

Ordering Related Issues

Consider a program which was written into a binary in this order:

Class Foo{ }
Class Bar{ }

Since object models have little coupling with the internal ordering of the original file, the rewritten file could appear as below:

Class Bar{ }
Class Foo{ }

As a consequence of such reordering, all references to these program elements will get rewritten with values different from the original binary.

Same semantics represented in different ways

General specifications for binary file formats may leave some leeway in how to encode certain items. For example, in the context of the EMCA CLI specification, it is valid to encode a String as either of the following:

```
long-form: (ELEMENT_TYPE_CLASS, TypeRef-to-System.String)
short-form: ELEMENT_TYPE_STRING
```

A binary-rewriter is free to transform any one form to any other form that is a syntactic variant, since the syntactic variants 218 are all semantically the same.

Padding and Alignments

Compilers sometimes add extra padding bytes between two metadata elements. These alignments and padding are not part of a rewriters' object model and hence rewriters are free to rewrite with the padding and/or alignment removed, added, or modified.

While binary equality means that the rewrite was reliable, the absence of binary equality need not mean the rewrite introduced defects. In our experience with binary rewriters, almost none of them produce bit level equality for any sufficiently complex and large input binary.

Semantic Equivalence of Metadata

While a vanilla rewriting may not guarantee bit level equality, it normally does guarantee the retention of the ordering of instructions for a well-defined granule (typically a method body) of a program. In other terms, for example, a vanilla rewriting keeps the code portion of every method body the same. This relieves us from solving the un-decidability problem of program equivalence. Below is an example vanilla rewriting that keeps instruction sequences the same (although the instruction payload may change in some details), but reorders instruction sequence position in the file:

Original Assembly
Body of MethodA( ) starts here:

```
Ldc.i4 100
Ldc.i4 200
Add
Call 0x06000010 // call MethodB( )
Ret
```

Body of MethodB( ) starts here:

```
Ldarg.0
Call 0x0a000020 // call System.Console.WriteLine( )
Ret
```

Rewritten Assembly
Body of MethodB( ) starts here:

```
Ldarg.0
Call 0x0a000080 // call System.Console.WriteLine( )
Ret
```

Body of MethodA( ) starts here:

```
Ldc.i4 100
Ldc.i4.200
Add
Call 0x06000009 // call MethodB( )
Ret
```

Original Assembly

With this instruction order invariant in mind, let us proceed to address determining program equivalence when the metadata units might be reordered or represented in syntactically different forms.

Portions of this discussion assume knowledge of CLI metadata, which is composed of many tables, with each table containing rows, each row containing columns. Each column is either a self-describing metadata or an index/offset into a row of some other table. The table description and interpretation of metadata is documented in the ECMA CLI specification. CLI metadata is used as an example, but the approaches discussed herein can also be applied to other metadata formats, such as the Java® Class file format (mark of Sun Microsystems, Inc.).

In some cases, metadata of a binary consists of various components each describing a program entity. Each metadata entity may be self-contained in that it does not depend on any other metadata entity to describe itself, or it may be composite because it depends on one or more other metadata components to describe itself. An entry in a StringHeap entity for example is self-contained since the string at the given offset does not refer to any other part of metadata to describe itself but instead represents a literal value. A row in a TypeReference table for example is composite, since a TypeReference entity describes itself by indexing into other metadata components, e.g., StringHeap, AssemblyReference table, and so on.

For assessing semantic equivalence it does not matter what the absolute file location or values of references are. It is sufficient if every element is logically present and corresponding elements can be shown to be equivalent across the vanilla rewrite. Going forward, we show how one can build rules of equivalence based on the specifications.

Let us denote equivalence of two metadata elements A and B by A≡B, and non-equivalence by A!≡B. We also use notations such as "$TypeA_{original} =_{TypeDef} TypeA_{rewritten}$" which means TypeA in an original (a.k.a. initial) assembly (binary file) is equivalent to TypeA in a rewritten assembly by means of rules of TypeDef equivalence.#

Semantic Equivalence in the Event of Reordering

Consider again the issue of ordering wherein a binary has two types Foo and Bar reordered. Assume that each binary has a TypeDef Table in which rows are organized according to the following format:

| row == | 0:Flags, |
| | 1:Name, |
| | 2:Namespace, |
| | 3:Extends, |
| | 4:FieldList, |
| | 5:MethodList |

Note that metadata are shown below with row entries spanning multiple lines of text, for better legibility in compliance with patent document format guidelines, but these metadata entries belong respectively to table rows 2 and 3 as indicated and hence the rows could be depicted in other documents with all entries of a given row shown on a single (and rather longer) line of text.

Original Assembly

| TypeDef Table: | |
| | |
| 2 == | 0:00100000, |
| | 1:string#13, |
| | 2:string#0, |
| | 3:TypeDefOrRef[01000001], |
| | 4:Field[4000001], |
| | 5:Method[6000001] |
| 3 == | 0:00100000, |
| | 1:string#17, |
| | 2:string#0, |
| | 3:TypeDefOrRef[01000001], |
| | 4:Field[4000001], |
| | 5:Method[6000002] |
| // String Heap: | |
| 00000013: Foo | |
| 00000017: Bar | |

Rewritten Assembly

| TypeDef Table: | |
| 2 == | 0:00100000, |
| | 1:string#23, |
| | 2:string#0, |
| | 3:TypeDefOrRef[01000001], |
| | 4:Field[4000001], |
| | 5:Method[6000001] |
| 3 == | 0:00100000, |
| | 1:string#27, |
| | 2:string#0, |
| | 3:TypeDefOrRef[01000001], |
| | 4:Field[4000001], |
| | 5:Method[6000002] |
| // String Heap: | |
| // 00000023: Bar | |
| // 00000027: Foo | |

A semantic equivalence relation for two metadata typedef tables when absolute positions of the equivalent types within the rows of tables could have changed is given by formalism (1):

(1) $TDTab_o \equiv_{TypeDefTable} TDTab_r$ iff [{for all $TD_o$ in $TDTab_o$ there exists $TD_r$ in $TBTab_r$}] and [{for all $TD_r$ in $TDTab_r$ there exists $TD_o$ in $TDTab_o$}: ($TD_o \equiv_{TypeDef} TD_r$) and (if $TD_i \equiv_{TypeDef} TD_k$ and $TD_j \equiv_{TypeDef} TD_k$ then $TD_i = TD_A$)].

Figure 5:
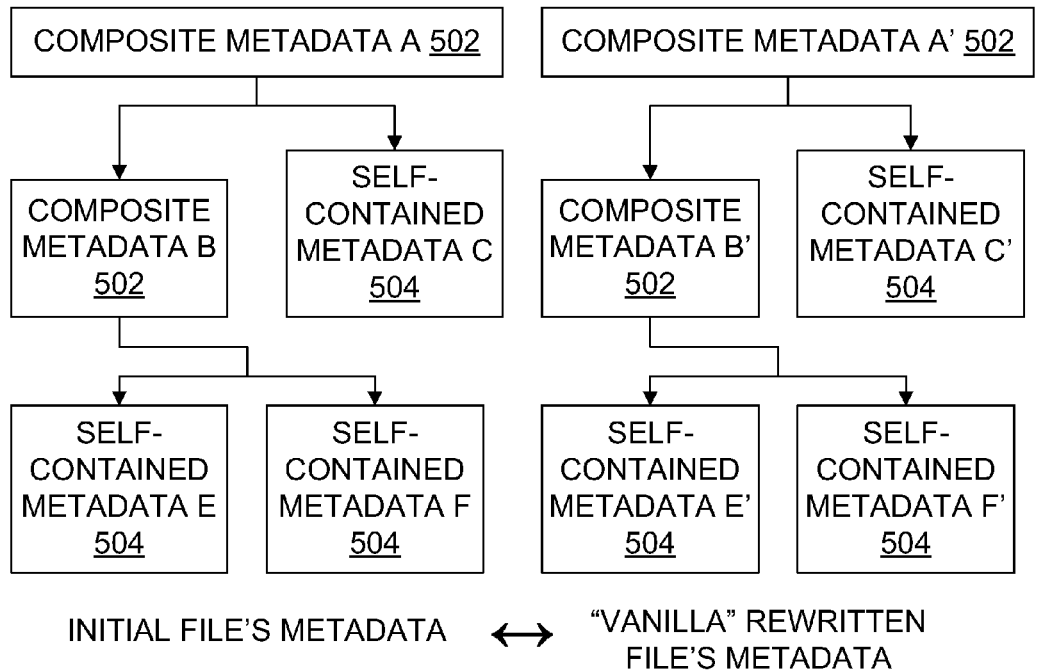
FIG. 5 is a diagram illustrating relationships between composite metadata and self-contained metadata, and between an initial low-level file and a rewritten low-level file.

That is, there is a bijective relation between the type definitions of the original and rewritten type definition tables. Addition or deletion of type definitions prevents semantic equivalence, and type definitions themselves can be shown equivalent by their equivalence rules using, e.g., rules defined later in this discussion. FIG. 5 illustrates equivalence of metadata when constituent entities are reordered, in an example showing composite metadata 502 and self-contained metadata 504.

Semantic equivalence of self-contained metadata entities

Consider the equivalence of two instructions which do not have any operands:

Original Assembly

...

Pop

...

Rewritten Assembly

...

Pop

...

By inspection, we can say that the two instructions will be semantically equivalent if the instruction opcodes match literally. Formally, $InstPop_{original} \equiv_{literal} InstPop_{rewritten}$ iff every byte of $InstPop_{original}$ is the same as every byte of $InstPop_{rewritten}$. Such literal equivalence can be seen, for example, on Flags of a type/field/method, on strings at different offsets in string heaps, and so on.#

Semantic Equivalence of Composite Metadata Entities

Consider the situation where we need to show that two type definitions $Foo_{original}$ and $Foo_{rewritten}$ are the same. $Foo_{original}$ and $Foo_{rewritten}$ are treated as semantically equivalent iff each and every sub-component of $Foo_{original}$ is equivalent to the corresponding sub-component of $Foo_{rewritten}$. The equivalence relation is $X_o \equiv_{TypeDef} Y_r$ iff none of the following conditions is violated:

(2a) $X_o.Flag \equiv_{literal} Y_r.Flag$ (the Flags of $X_o$ literally match with flags of $Y_r$)

(2b) $X_o.Name \equiv_{string} Y_r.Name$ and $X_o.Namespace \equiv_{string} Y_r.Namespace$ (the Name and Namespace string components match)

(2c) $X_o.Extends \ E_{TypeRefDef} Y_r.Extends$ (the Extends components match)

(2d) {for all $F_o$ in $FD_{xo}$ there exists $F_r$ in $FD_{yr}$} and [{for all $F_r$ in $FD_{yr}$ there exists $F_o$ in $FD_{xo}$}: ($F_o \equiv_{FieldDef} F_r$) and (if $F_i \equiv_{FieldDef} F_k$ and $F_j \equiv_{FieldDef} F_k$ then $F_i = F_j$)] (that is, where there is a set of fields belonging to $X_o$ in the original assembly's field definition table and a set of fields belonging to $Y_r$ in the rewritten assembly's type definition table the lists of fields match)

(2d) {for all $M_o$ in $MD_{xo}$ there exists $M_r$ in $MD_{yr}$} and [{for all $M_r$ in $MD_{yr}$ there exists $M_o$ in $MD_{xo}$}: ($M_o \equiv_{MethodDef} M_r$) and (if $M_i \equiv_{MethodDef} M_k$ and $M_j \equiv MethodDef \ M_k$ then $M_i = M_j$)] (that is, where there is a set of methods belonging to $X_o$ in the original assembly's field definition table and a set of methods belonging to $Y_r$ in the rewritten assembly's type definition table the lists of methods match)

It can be asked what happens if the attributes (e.g custom attributes) attached to these types differ. Since proving that two binaries are equivalent involves proving equivalence of every metadata component, eventually the verifier tool 202 does reach a point where it verifies the equivalence of attributes. At that point the tool infers either equivalence or non-equivalence of attributes, and comparison is complete.

From above it may be seen that showing equivalence of composite metadata entity involves showing equivalence of a transitive closure of every constituent component of the composite metadata entity, which eventually involves showing equivalence of self-contained metadata entities. However, showing equivalence of a metadata entity need not involve proving equivalence of metadata entity that it is a constituent of. FIG. 5 illustrates composite metadata equivalence.

Semantic equivalence of syntactically varying metadata elements

On occasion a given program element can be represented in different syntactic ways. For example, a serialized typeof (system.Int32) custom attribute can represent its SerString

[ECMA Section 23.3] component in any one of the following three string forms without any difference in the program behavior:

---
(a) System.Int32, MsCorlib, Version =4.0.0.0, Culture = En-Us, PublicKeyToken = 12345678
(b) System.Int32, MsCorlib
(c) System.Int32

---

The literal match of bytes (for a self-contained metadata entity) fails in the above context. However, since the specification (ECMA in this case) describes various ways in which same entity can be encoded, we define an equivalence relation that is a logical disjunction of various possibilities.

(3) $SerType_{original} \equiv_{SerString} SerType_{rewritten}$ iff $\{SerType_{original} \equiv_{literal} SerType_{rewritten}\}$ or $\{(SerType.TypeName_{original} \equiv_{literal} SerType.TypeName_{rewritten})$ and $((SerType.AssemblyName_{original} \equiv_{literal}$ empty or $SerType.AssemblyName_{rewritten} \equiv_{literal}$ empty) or $(SerType.AssemblyName_{original} \equiv_{literal} SerType.AssemblyName_{rewritten}$ and $(SerType.AssemblyQualifiers_{original} \equiv_{literal}$ empty or $SerType.AssemblyQualifiers_{rewritten} \equiv_{literal}$ empty)))$\}$ The custom attribute example serves to show how to derive an equivalence relation for semantically identical entities when the self-contained metadata entities do not yield a literal match but are syntactic variants 218.

Semantic equivalence of asymmetric metadata elements

Above we have seen how to derive an equivalence relation between two metadata entities of same kind, for example two method bodies, two type definitions, two strings, and so on. Let us call such equivalence a symmetric-metadata equivalence. As an extension, below we show how to derive semantic equivalence when metadata entities being compared are asymmetric.

Original Assembly
IsInst 0x1B00000002
Rewritten Assembly
IsInst 0x02000003

Figure 6:
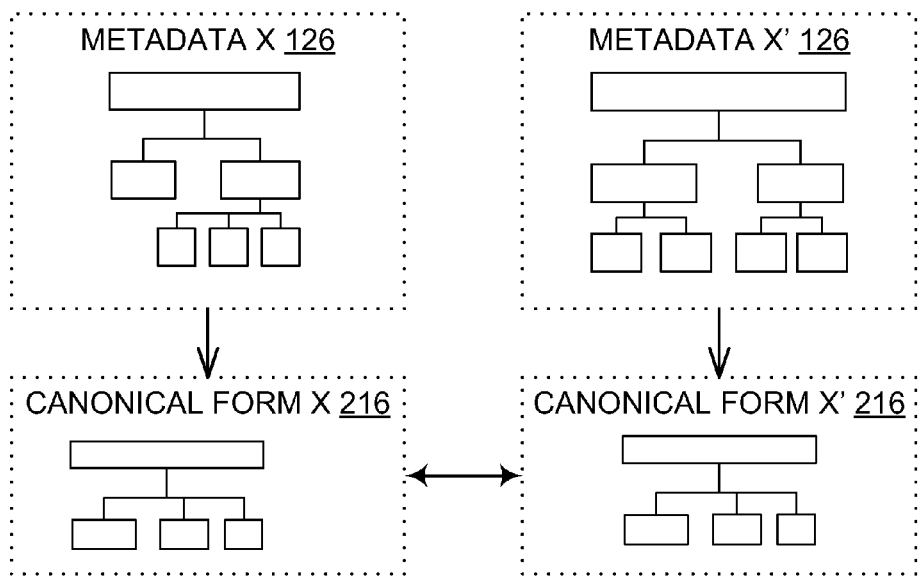
FIG. 6 is a diagram illustrating relationships between low-level file metadata and canonical forms for such metadata.

As can be seen, the IsInt instruction can take as operand either a TypeDef or a TypeSpec (or even a TypeRef as per the specifications). In the above example the original operand is a TypeSpec (0x1B00000002) whereas the rewritten operand is a TypeDef (0x02000003). Accordingly, we compare two asymmetric composite metadata entities for equivalence. In such situations, we convert each form into a canonical form 216 and compare the canonical representations for equivalence. For example in the above case, we convert the TypeSpec form to a TypeDef form and compare the two TypeDefs. FIG. 6 gives a pictorial representation of comparing two asymmetric metadata entities.

SUMMARY

Vanilla rewriting may be viewed as a non-substantive transformation which preserves metadata semantic equivalence when performed properly. Vanilla rewriting followed by semantic equivalence testing of all metadata entities allows a more exhaustive verification of binary rewriters. Though we do not enumerate here all equivalence relations, we have described and exemplified how variations in semantics can occur, and how equivalence relations can be derived from the knowledge of program semantics and understanding of metadata file format specifications. Such semantic driven verification can complement classical scenario driven targeted testing, or it can be used as an alternative to scenario driven testing. Semantic driven verification not only helps ensure fidelity of a rewritten assembly, but also provides leeway for syntactic differences to exist. When semantic driven verification is enforced on the rewriter immediately after the rewrite process, the prospect of catching any discrepancy in the rewriting is excellent. This approach has no false negatives and has few or no false positives. Utilizing such semantic verifier tools 202 at the source point of rewriting in the production environment helps early detection of binary-rewriting defects and reduces cost involved in fixing bugs, testing and maintenance.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 3 and 4 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A process for verifying operation of a low-level rewriter, the process utilizing a device which has at least one logical processor in operable communication with at least one memory, the process comprising the steps of:
obtaining initial low-level file(s) containing code and metadata;
generating rewritten low-level file(s) from the initial low-level file(s) by applying the low-level rewriter to the initial low-level file(s) independently of any low-level code transformation; and
comparing metadata of the initial low-level file(s) with matching metadata of the rewritten low-level file(s) for semantic equivalence, wherein the comparing step comprises at least one of the following:
testing for equality between flag(s) of a metadata entity of the initial low-level file(s) and flag(s) of a matching metadata entity of the rewritten low-level file(s);
testing for equality between a string of a metadata entity of the initial low-level file(s) and a string of a matching metadata entity of the rewritten low-level file(s);
testing for equality between field(s) of a metadata entity of the initial low-level file(s) and field(s) of a matching metadata entity of the rewritten low-level file(s);
testing for equality between method(s) of a metadata entity of the initial low-level file(s) and method(s) of a matching metadata entity of the rewritten low-level file(s).

2. The process of claim 1, wherein the comparing step comprises distinguishing composite metadata entities from self-contained metadata entities.

3. The process of claim 2, wherein the comparing step comprises testing for bitwise equality of a self-contained metadata entity of the initial low-level file(s) and a matching self-contained metadata entity of the rewritten low-level file(s).

4. The process of claim 1, wherein the comparing step comprises comparing a transitive closure of metadata of the initial low-level file(s) with a transitive closure of metadata of the rewritten low-level file(s) for semantic equivalence.

5. The process of claim 1, wherein the initial low-level file(s) contain a metadata entity alpha_initial and a metadata entity beta_initial in that alpha-beta order relative to one another, the generating step places in the rewritten low-level file(s) a metadata entity beta_rewritten and a metadata entity alpha_rewritten in that beta-alpha order relative to one another, and the process further comprises matching alpha_initial with alpha_rewritten and matching beta_initial with beta_rewritten.

6. The process of claim 1, wherein the process further comprises matching a metadata entity alpha_initial in the initial low-level file(s) with a metadata entity alpha_rewritten in the rewritten low-level file(s) after determining that each entity has the same literal ordering of method body instruction(s) and that operand(s), if any, of those corresponding instructions are semantically equivalent.

7. The process of claim 1, wherein the process further comprises matching a metadata entity alpha_initial in the initial low-level file(s) with a metadata entity alpha_rewritten in the rewritten low-level file(s) after determining that one entity is a syntactic variant of the other entity.

8. The process of claim 1, wherein the process further comprises matching a metadata entity alpha_initial in the initial low-level file(s) with a metadata entity alpha_rewritten in the rewritten low-level file(s) after converting each entity into a canonical form.

9. A computer-readable memory configured with data and with instructions that when executed by at least one processor causes the at least one processor to perform a process for binary rewriter verification, the process comprising the steps of:
obtaining an initial binary file containing code and metadata;
generating a rewritten binary file from the initial binary file by applying the binary rewriter to the initial binary file independently of any binary code transformation;
distinguishing a composite metadata entity in the initial binary file from a self-contained metadata entity in the initial binary file;
comparing a metadata entity alpha_initial in the initial binary file with a metadata entity alpha_rewritten in the rewritten binary file for semantic equivalence after determining that one entity is a syntactic variant of the other entity; and
comparing additional metadata of the initial binary file with additional metadata of the rewritten binary file for semantic equivalence.

10. The configured memory of claim 9, wherein the comparing step comprises at least one of the following:
testing for equality between flags of a metadata entity of the initial binary file and flags of a metadata entity of the rewritten binary file;
testing for equality between a string of a metadata entity of the initial binary file and a string of a metadata entity of the rewritten binary file;
testing for equality between fields of a metadata entity of the initial binary file and fields of a metadata entity of the rewritten binary file;
testing for equality between methods of a metadata entity of the initial binary file and methods of a metadata entity of the rewritten binary file;
testing for bitwise equality of a self-contained metadata entity of the initial binary file and a self-contained metadata entity of the rewritten binary file.

11. The configured memory of claim 9, wherein the comparing step comprises comparing a transitive closure of metadata of the initial binary file with a transitive closure of metadata of the rewritten binary file for semantic equivalence.

12. The configured memory of claim 9, wherein the initial binary file contains a metadata entity alpha_initial and a metadata entity beta_initial in that alpha-beta order relative to one another, the generating step places in the rewritten binary file a metadata entity beta_rewritten and a metadata entity alpha_rewritten in that beta-alpha order relative to one another, and the process comprises comparing alpha_initial with alpha_rewritten for semantic equivalence and comparing beta_initial with beta_rewritten for semantic equivalence.

13. The configured memory of claim 9, wherein the process comprises comparing a metadata entity alpha_initial in the initial binary file with a metadata entity alpha_rewritten in the rewritten binary file for semantic equivalence after determining that each entity has the same literal ordering of method body instructions and that the operands of instructions (if any) are semantically equivalent.

14. The configured memory of claim 9, wherein the process further comprises converting at least one metadata entity in at least one of the binary files into a canonical form.

15. A computer system comprising:
a logical processor;
a memory in operable communication with the logical processor;
an initial binary file residing in the memory and containing code and metadata;
a binary rewriter verification tool residing in the memory and having a metadata semantic equivalence tester;
at least one of:
- a binary rewriter residing in the memory;
- a rewritten binary file residing in the memory;

and
a determination produced by the binary rewriter verification tool as to metadata semantic equivalence of the initial binary file and at least one of: the rewritten binary file, a file produced using the binary rewriter.

16. The system of claim 15, further comprising a transitive closure of metadata of the initial binary file, the transitive closure residing in the memory.

17. The system of claim 15, further comprising a structural mapping between a metadata entity alpha_initial in the initial binary file and a metadata entity alpha_rewritten in the rewritten binary file, wherein each entity has the same literal ordering of method body instructions and wherein operands of corresponding instructions of entities are semantically equivalent.

18. The system of claim 15, further comprising a structural mapping between a metadata entity alpha_initial in the initial binary file and a metadata entity alpha_rewritten in the rewritten binary file, wherein one entity is a syntactic variant of the other entity.

19. The system of claim 15, further comprising a structural mapping between a canonical form of a metadata entity alpha_initial in the initial binary file and a canonical form of a metadata entity alpha_rewritten in the rewritten binary file.

* * * * *